2 Sheets—Sheet 1
J. H. WILLIAMS.
Tire-Tightener.
No. 17,532.   Patented June 9, 1857.
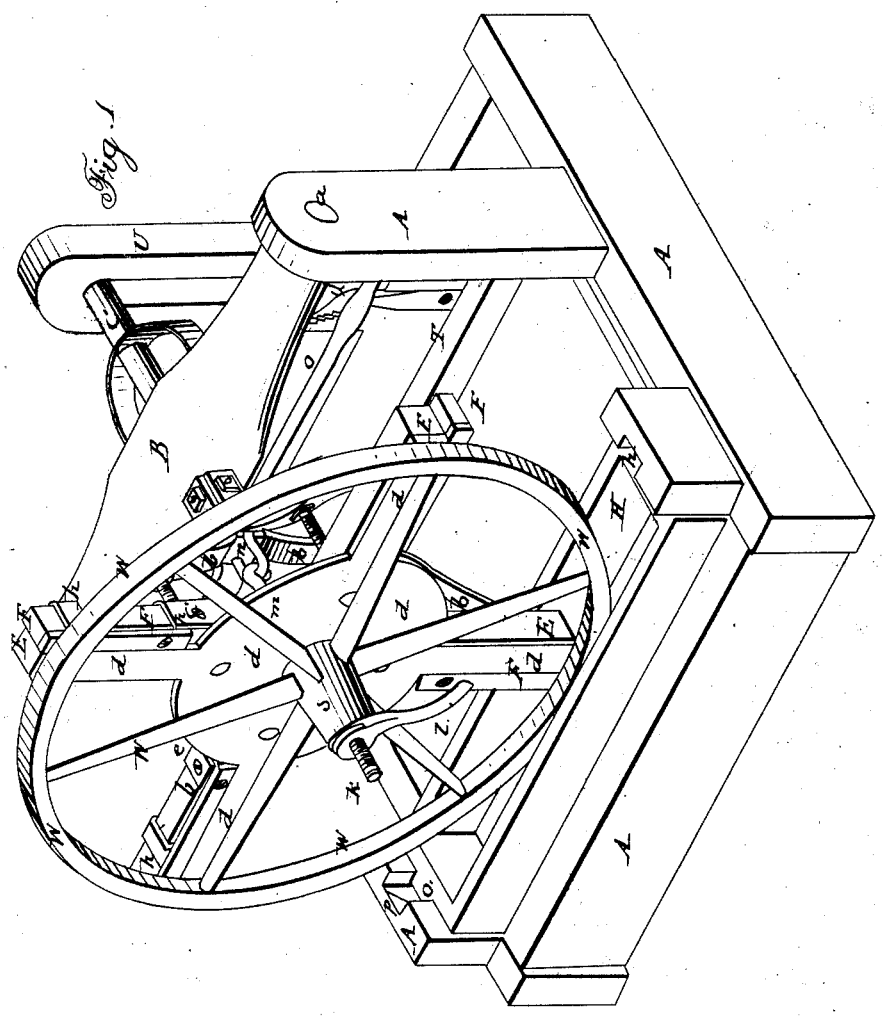

J. H. WILLIAMS.
Tire-Tightener.
No. 17,532.
2 Sheets—Sheet 2.
Patented June 9, 1857.
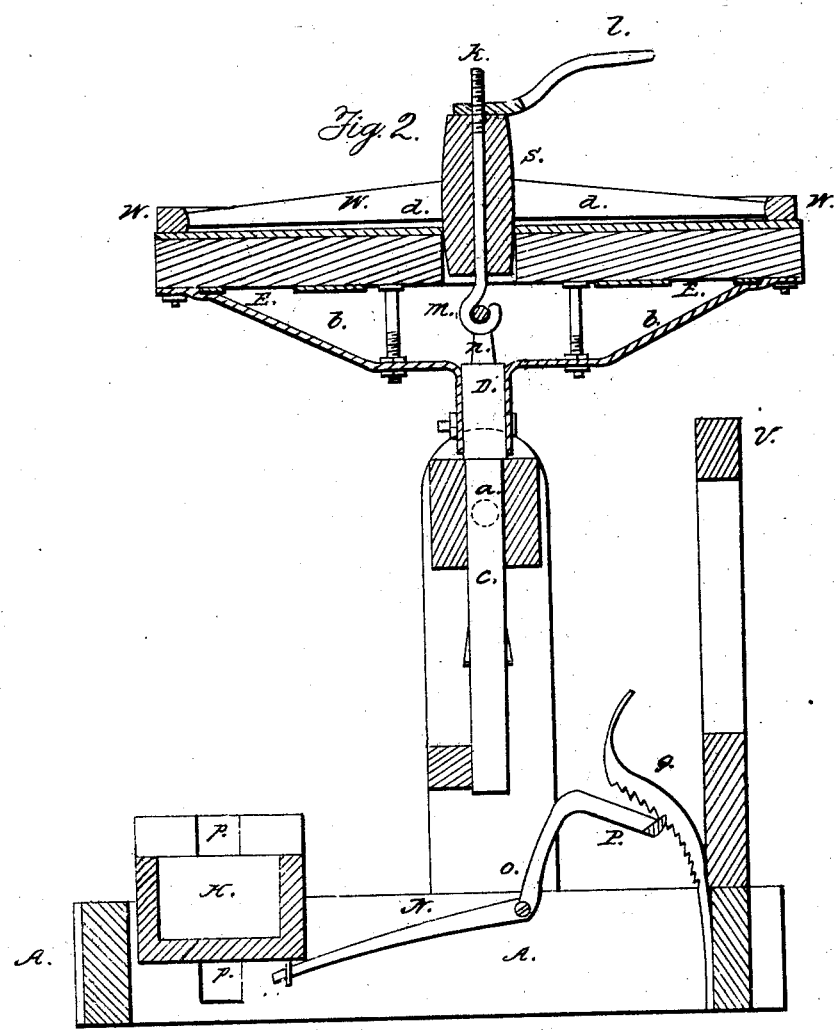

UNITED STATES PATENT OFFICE.

JOHN H. WILLIAMS, OF PLEASANT HILL, OHIO.

MACHINE FOR SETTING TIRES ON WHEELS.

Specification of Letters Patent No. 17,532, dated June 9, 1857.

*To all whom it may concern:*

Be it known that I, J. H. WILLIAMS, of Pleasant Hill, in the county of Miami and State of Ohio, have invented certain new and useful Improvements in Machines for Setting Tires on Wheels of Vehicles and for Regulating the Shape of Said Wheels; and I do hereby declare that the following is a full, clear, and exact description of the same, reference being had to the accompanying drawings, making a part thereof, in which—

Figure 1, represents a perspective view of said machine showing the wheel and frame to which the wheel is fastened in a vertical position. Fig. 2, represents a vertical cross section showing the frame and wheel fastened to it both in a horizontal position.

The nature of this invention relates to the peculiar construction of an apparatus which serves to retain the wheel of a vehicle in a true position during the process of setting the tire on said wheel preventing said wheel from dishing, and which apparatus, affords the means of placing the wheel easily in a horizontal or vertical position as the operator may require.

To enable others skilled in the art to make and use my invention, I will proceed to describe its construction and operation.

A represents the frame of the machine. B is a shaft which can be turned on its journals $a$, which are supported by standards of the frame A.

C is a shaft which passes at right angles through shaft B, and which can be turned with the same on the axis of the latter. $b$, $b$, represents four heavy metal braces, which are bolted to the square head D, of the shaft C, and which serve to support a frame which is bolted to the ends of said braces. The frame is composed of four arms E, which are united by a metal hub and arms $d$; the hub $d$, has an opening at its center of sufficient diameter to admit the hub of any wheel, which is to be fastened to the frame E. To each of the arms E is attached a sliding piece F, which is likewise protected in front by a metal plate. These pieces F, can be slid within the bands $h$, and thus serve the purpose of elongating the arms E, should the size of the wheel require it; the sliding pieces F can be fastened at any desired points by means of the set screws $e$.

K is a belt provided at one end with a hook $m$ which passes through an ear $n$ of the head D; the bolt $k$ passes through the hub S, of the wheel W, and the latter is fastened down to the frame E by means of screw lever $l$.

H is a trough provided at both its ends with projections $o$ which slide in corresponding grooves $p$ in the frame A. The trough H, is supported by a double bent lever N, having its fulcra at O, and which is held in any desired position by the teeth of the rack Q, taking hold of the cross bar which connects the levers P; the rack Q, is bolted at its lower and thinner end to the frame A, which can be disengaged from the levers P by pressing it to the rear. When the shaft C, is placed in a horizontal position, as in Fig. 1, its rear end passes through a slot in standard U, abutting against the upper end of said slot by which means the wheel is retained in its horizontal position.

The operation of this machine is as follows: The wheel on which the tire is to be set is placed against the arms E, F, they being then in a vertical position as represented in Fig. 1; the hub of the wheel passing through the perforation in the plate $d$, and the wheel is fastened to the frame by means of the screw lever $l$, the fellies bearing against the arms E or F. The hand lever $l$, is now turned until the wheel W, has been set into the proper dish shape. The rack Q is now pressed to the rear and the arms P, are disengaged from the teeth of said rack; by now pressing down the levers P the ends of levers N, are raised and with them the trough H, and the water in said trough comes in contact with the fellies of the wheel. By turning the wheel and frame on shaft C, the fellies are passed through the water, and the wheel is then turned into a horizontal position as represented in Fig. 2, the shaft C, being retained in a vertical position by leaning against the cross tie T. The tire is now put on the wheel, and when this operation is completed the wheel is returned to the vertical position of Fig. 1, and its circumference is passed through the water for the tire to cool. By this same machine also the dish of a wheel already made, may be regulated.

Having thus fully described the nature of my invention what I claim therein as new and desire to secure by Letters Patent is—

Hanging the frame to which the wheel is secured to a revolving shaft, so that the wheel may be turned up into a horizontal position for the facility of working at it, and then into a vertical position to bring the perimeter of the wheel into the water trough, substantially in the manner and for the purpose as described.

JOHN H. WILLIAMS.

Witnesses:
A. VOORHEES,
J. H. FRETZ.